(12) United States Patent
Vaithilingam et al.

(10) Patent No.: US 8,539,002 B2
(45) Date of Patent: Sep. 17, 2013

(54) SUBJECTIVE INFORMATION RECORD FOR LINKING SUBJECTIVE INFORMATION ABOUT A MULTIMEDIA CONTENT WITH THE CONTENT

(75) Inventors: Gandhimathi Vaithilingam, Mountain View, CA (US); Mohamed Abdel-Mottaleb, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 303 days.

(21) Appl. No.: 09/797,084

(22) Filed: Mar. 1, 2001

(65) Prior Publication Data

US 2001/0047357 A1 Nov. 29, 2001

Related U.S. Application Data

(60) Provisional application No. 60/189,318, filed on Mar. 14, 2000.

(51) Int. Cl.
*G06F 17/00* (2006.01)
(52) U.S. Cl.
USPC ........... 707/804; 707/791; 707/793; 707/802; 707/822; 707/825
(58) Field of Classification Search
USPC ................. 707/100, 104.1, 10, 791, 793, 802, 707/804, 822, 825; 455/2.01, 3.05; 725/28, 725/39, 45, 46, 51, 53
See application file for complete search history.

(56) References Cited

U.S. PATENT DOCUMENTS

| 5,485,611 | A | * | 1/1996 | Astle .................................. 707/1 |
| 5,813,009 | A | * | 9/1998 | Johnson et al. ............... 707/100 |
| 5,835,087 | A | * | 11/1998 | Herz et al. ..................... 715/810 |
| 5,956,708 | A | * | 9/1999 | Dyko et al. ........................ 707/3 |
| 5,983,214 | A | * | 11/1999 | Lang et al. ............................ 1/1 |
| 6,002,394 | A | * | 12/1999 | Schein et al. .................... 725/39 |
| 6,185,288 | B1 | * | 2/2001 | Wong ............................. 379/219 |
| 6,263,022 | B1 | * | 7/2001 | Chen et al. ............... 375/240.03 |
| 6,311,194 | B1 | * | 10/2001 | Sheth et al. .................... 715/505 |
| 6,466,918 | B1 | * | 10/2002 | Spiegel et al. ............... 705/7.29 |
| 6,513,069 | B1 | * | 1/2003 | Abato et al. ................... 709/238 |
| 6,564,263 | B1 | * | 5/2003 | Bergman et al. ............. 709/231 |

OTHER PUBLICATIONS

"DAVIC 1.5 Specifications—TV Anytime and TV Anywhere", DAVIC—Digital Audio-Visual Council, Apr. 1999, pp. 66, 69, 73 and 79.
"MD2L: Content Description of Multimedia Documents for Efficient Process and Search/Retrieval", Hu et al, Proceedings of the Forum on Research and Technology Advances in Digital Libraries, May 19, 1999, pp. 200-213.

* cited by examiner

*Primary Examiner* — Sana Al Hashemi

(57) ABSTRACT

A subjective information record for inputting data that enables subjective information about a multimedia content to be represented with well defined syntax and semantics and linked to the multimedia content. The record includes a field for inputting data that identifies a multimedia content and a location of the multimedia content; a field for inputting data that identifies an author of subjective information about the multimedia content; a field for a language of the subjective information; and a field for subjective information about the content.

16 Claims, 1 Drawing Sheet

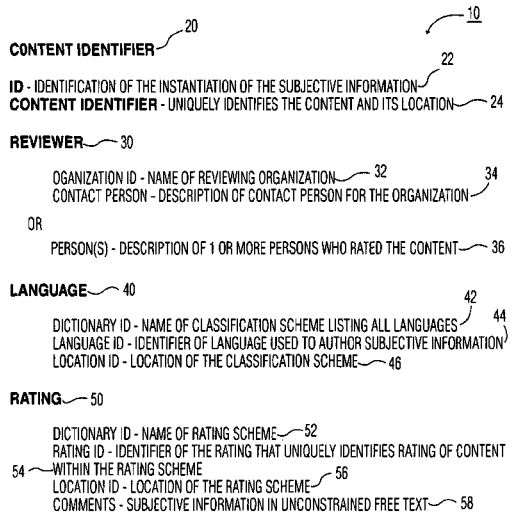

CONTENT IDENTIFIER — 20 — 10

ID - IDENTIFICATION OF THE INSTANTIATION OF THE SUBJECTIVE INFORMATION — 22
CONTENT IDENTIFIER - UNIQUELY IDENTIFIES THE CONTENT AND ITS LOCATION — 24

REVIEWER — 30

OGANIZATION ID - NAME OF REVIEWING ORGANIZATION — 32
    CONTACT PERSON - DESCRIPTION OF CONTACT PERSON FOR THE ORGANIZATION — 34

OR

PERSON(S) - DESCRIPTION OF 1 OR MORE PERSONS WHO RATED THE CONTENT — 36

LANGUAGE — 40

DICTIONARY ID - NAME OF CLASSIFICATION SCHEME LISTING ALL LANGUAGES — 42
    LANGUAGE ID - IDENTIFIER OF LANGUAGE USED TO AUTHOR SUBJECTIVE INFORMATION — 44
    LOCATION ID - LOCATION OF THE CLASSIFICATION SCHEME — 46

RATING — 50

DICTIONARY ID - NAME OF RATING SCHEME — 52
    RATING ID - IDENTIFIER OF THE RATING THAT UNIQUELY IDENTIFIES RATING OF CONTENT
54 — WITHIN THE RATING SCHEME
    LOCATION ID - LOCATION OF THE RATING SCHEME — 56
    COMMENTS - SUBJECTIVE INFORMATION IN UNCONSTRAINED FREE TEXT — 58

FIG. 1

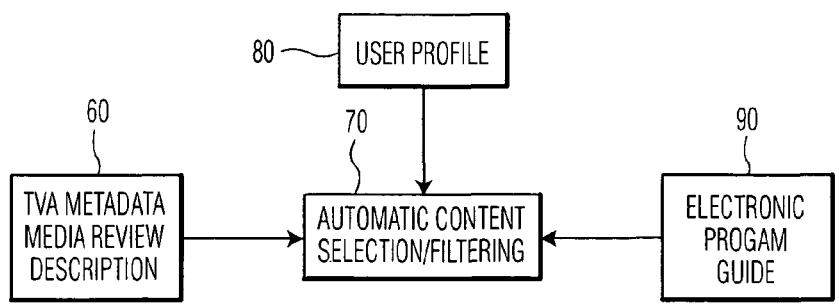

FIG. 2

SUBJECTIVE INFORMATION RECORD FOR LINKING SUBJECTIVE INFORMATION ABOUT A MULTIMEDIA CONTENT WITH THE CONTENT

CROSS REFERENCE TO RELATED APPLICATIONS

The present application claims the benefit of U.S. Provisional Application Ser. No. 60/189,318, filed on Mar. 14, 2000.

FIELD OF THE INVENTION

This invention relates to content distribution and in particular, to a subjective information record for linking subjective information about a multimedia content with the content.

BACKGROUND OF THE INVENTION

The arrival of network technologies, such as the Internet and the World-Wide Web (WWW), has resulted in the availability of vast quantities of multimedia content. Multimedia contents are available in digital archives, in broadcast datastreams, in personal and professional databases, and the like. The value of this vast quantity of multimedia contents depends upon the ease in which it can be found, retrieved, accessed, filtered and managed.

Subjective information about a multimedia content is an important factor influencing the selection of the content. Subjective information may include ratings or opinions provided by one or more persons on a multimedia content. Selection of a multimedia content based on other people's opinions, i.e., third party reviews, is a method commonly referred to as social filtering.

Social filtering methods are commonly employed at internet websites. Users at a website provide details of their preferences in a certain domain, for example, buying books or music CDs. The users are then recommended certain products based on their preferences and the products purchased by other users with similar preferences.

Media, such as television programs and movies, are often selected using social filtering methods also. In selecting television programs, reference is often made to program ratings found in TV GUIDE or in newspapers. Movie selections are often made by referring to reviews penned by critics whose interests most closely match the viewers.

Although conventional social filtering methods are quite useful for selecting multimedia contents, they have a number of limitations. One limitation is that subjective information about a multimedia content, as found in printed materials, on the internet, or in electronic program guides, is not directly linked to the content. Consequently, user-preference based automatic selection or filtering of content is made difficult. Another limitation is that the author of the subjective information is often anonymous. For example, the authors of subjective information found in local TV GUIDES or electronic program guides (EPGs) available from service providers is typically not provided. Hence, a viewer cannot be assured that his or her viewing preferences match those of the person(s) who rated the programs. Still another limitation involves the internet or in interactive television applications, where no mechanism is provided for choosing from multiple reviews of a single content. This is due to the lack of a mechanism for linking the subjective information directly to the content. Thus, users have no choice in determining which source of subjective information they wish to receive to enable their content selection.

SUMMARY OF THE INVENTION

One aspect of the invention involves a subjective information record for inputting data that enables subjective information about a multimedia content to be represented with well defined syntax and semantics and linked to the multimedia content. The record comprises a field for inputting data that identifies a multimedia content and a location of the multimedia content; a field for inputting data that identifies an author of subjective information about the multimedia content; a field for a language of the subjective information; and a field for subjective information about the content.

A further aspect of the invention involves a method for linking subjective information about multimedia content to the content so that the content can be automatically selected or filtered by a user. The method comprises providing the above described subjective information record and linking subjective information generated by the author to the content using the subjective information record.

A another aspect of the invention involves a multimedia content retrieval and filtering apparatus comprising a multimedia filter; an electronic program guide for inputting feature data describing each multimedia program into the filter; a user profile for inputting user profile and viewing history data into the filter; and a subjective information record for inputting data into the filter. The subjective information record enables subjective information about a multimedia content to be represented with well defined syntax and semantics and linked to the multimedia content.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein:

FIG. 1 is a diagram of a subjective information record according to an illustrative embodiment of the present invention; and FIG. 2 is a block diagram illustrating an exemplary embodiment a multimedia content retrieval and filtering system that utilizes the subjective information record of the present invention.

DETAILED DESCRIPTION OF THE INVENTION

FIG. 1 is a subjective information record 10 according to an illustrative embodiment of the present invention. The record comprises a plurality of fields for inputting data pertaining to subjective information about a multimedia content, thus, generating a structured representation of the subjective information, i.e., a media review description which may be advantageously used to link the subjective information about the multimedia content with the content. The fields of the record may include a content identifier field 20, a subjective information reviewer or rating field 30, a subjective information language field 40, and a subjective information field 50.

The content identifier field 20 may include two subfields: an identification subfield 22 for the identification of the instantiation of the subjective information and a content identifier subfield 24 for the identification and location of the content. The data provided in the content identifier field 24 enables subjective information about a multimedia content to be directly linked to the multimedia content, therefore enabling automatic selection/filtering of content using conventional selection/filtering techniques.

The subjective information reviewer field 30 may include three subfields: an organization identification subfield 32 for the name of the reviewing organization; a contact person subfield 34 for the description of the contact person for the organization; and a person(s) subfield 36 for the description of 1 or more persons who rated the content. The subjective information reviewer field 30 allows a user to decide whether a particular reviewer's subjective information will be used in the user's content selection/filtering process. The reviewer may be an organization such as MPAA (Motion Pictures Association of America) or an individual or group of individuals such as SISKEL & EBERT. The reviewer field also allows multiple instances of subjective information about a single content by multiple reviewers.

The reviewer field may include additional subfields (not shown) which further identify the reviewer. For example, a subfield may be provided for the location of additional information about the reviewers. Another subfield may be provided for the type of content that the reviewer(s) are proficient in rating and the like.

The subjective information language field 40 may include three subfields: a dictionary identification subfield 42 for the name of the classification scheme listing all languages; a language identification subfield 44 for an identifier of the language used to author the subjective information; and a location identification subfield 46 for the location of the classification scheme. The subjective information language field 40 provides access to multiple instances of the subjective information by the same author, in different languages.

The subjective information field 50 includes four subfields: a dictionary identification subfield 52 for the name of the rating scheme; a rating identification subfield 54 for an identifier of the rating which uniquely identifies rating of content within a rating scheme; a location identification subfield 56 for the location of the rating scheme; and a comments subfield 58 for the subjective information in unconstrained free text. The subjective information rating field 50 may be a constrained value, such as from a pre-defined rating scheme. In the present embodiment the name of the rating scheme, the unique identifier within the rating scheme assigned to the content and the location of the rating scheme are specified in the rating information. For example, the rating can be a numerical rating coined by the review, for example, a scale of 1 to 10, 1 being sleep inducing and 10 being mind blowing. The rating can also be unconstrained free text. In another example, assume that MPAA is the entity whose rating scheme is used to review and rate a content, that the multimedia content is rated PG-13, that the MPAA rating scheme is fully defined (G, PG, PG-13, R, etc. and what each of these ratings imply) on website www.mpaa.org/rating-scheme. Assume also that the free text for the content reads "The graphic effects in this movie are very realistic." The rating for this content may look like the following:

Rating:
Dictionary id—MPAA
Rating id—PG-13
Location id—www.mpaa.org/rating-scheme
Comments—The graphic effects in this movie are very realistic The subjective information subfields are constructed in this manner so as to enable any third party to define a rating scheme of their own and then reference it using the location information and a value within that scheme to rate a content.

The subjective information record of the invention can be employed in MPEP-7. MPEG-7 is a multimedia retrieval standard that specifies a standard set of descriptors that may be used to describe various types of multimedia information. It will also set forth methods for associating audiovisual descriptions with the audiovisual material to be located. The subjective information record of the invention may be embodied as an MPEG-7 description scheme and may be linked to the associated multimedia content by a mechanism defined by MPEG-7 or any conventional linking mechanism.

The MPEG-7 embodiment of the record of the invention has also been adopted into the set of Metadata Schemas being defined by TV-Anytime. As illustrated in FIG. 2, the subjective information record of the present invention may be embodied as a metadata structure 60 recognized and implemented within TV-Anytime, for representing and linking subjective information about a multimedia content with the content for TV-Anytime applications. TV-Anytime is a standard which will define open specifications to enable audio-visual and other services on consumer platforms with high volume digital storage.

The ability to represent and link subjective information about a multimedia content to the content is especially useful in multimedia content retrieval and filtering systems and devices utilized for example, in conventional TV recommenders or personal television (PTV) services, which typically employ personal television (TV) recorders equipped with mass storage devices that digitally record multimedia. As illustrated in FIG. 2, an exemplary multimedia content retrieval and filtering system includes conventional multimedia filtering software 70 that selects and records multimedia contents in accordance with user profile data and user viewing history data stored in a user profile 80 and data supplied by an electronic program guide 90 (EPG) which contains features describing each multimedia program such as title, channel, start time and the like. In accordance with the present invention, the user profile data may include the multimedia review preferences of the user. The multimedia review preferences stored in the user's viewing profile 80 and the program data stored in the EPG 90 may be utilized by the filtering software 70 to select and record desired multimedia content, in conjunction with the subjective information record 60 about the multimedia content that may accompany the content.

In the case of a PTV service provider, the subjective information about a multimedia content, as provided by the record of the invention, may be streamed with the content in a synchronized manner or may be made available by the PTV service provider using a different delivery mechanism. In the latter case, the PTV service provider may provide an internet website and use the electronic program guide (EPG) as the mechanism for delivering the subjective information via the record of the invention. The EPG with the subjective information is downloaded periodically, and based on the settings in the user's profile, the television programs to be viewed are selected automatically. The user may also choose to select content manually based on the subjective information displayed for that content, for example, as the user browses through the EPG.

As should now be apparent, the subjective information record of the present invention enables representation of the subjective information about multimedia content in a uniform manner, i.e., with well defined syntax and semantics, and for this information to be directly linked to the content, so that content can be automatically filtered using content selection/filtering technique. In particular, the subjective information record provides the means for identifying the author of the subjective information, hence, providing users with the option of using the subjective information in their user-preference based content selection/filtering process.

The record of the present invention also permits multiple instances of subjective information to be linked to a single content, thereby, providing users with a selection of subjective information to choose from in their user-preference based content selection/filtering process. For example, reviewers A and B may review a movie. Based on prior experience, a user may prefer reviewer A over reviewer B for television programs and movie ratings. Thus, the user enters this preference in the user's content selection/filtering profile. In accordance with the settings in the user's profile, the version of the EPG with reviewer A's ratings are downloaded, and reviewer A's subjective information is employed in the user's content selection/filtering process.

The ability to access multiple instances of subjective information about a single content also allows ratings by different reviewers to be combined in different ways to come up with a single rating. For example, a viewer may want to watch only those movies that are rated excellent by eighty percent of the reviewers.

Another advantage provided by the record of the present invention is that it enables subjective information to be made available in multiple languages. This feature expands the scope of users who can benefit from content retrieval and filtering.

It should be understood that the fields of the subjective information record of the present invention are not limited to the fields described herein.

While the foregoing invention has been described with reference to the above embodiments, various modifications and changes can be made without departing from the spirit of the invention. Accordingly, such modifications and changes are considered to be within the scope of the appended claims.

What is claimed is:

1. A non-transitory computer readable medium embodying a subjective information record for inputting data that enables subjective information about a multimedia content, the record comprising:
   a field for inputting data that identifies a multimedia content and a location of the multimedia content;
   a field for inputting data that identifies an author of subjective information about the multimedia content; and
   a field for subjective information about the multimedia content;
   wherein the identifier in the field for inputting data that identifies a multimedia content and a location of the multimedia content enables a multimedia retrieval system to link the subjective information to the multimedia content, and
   wherein the field for inputting data that identifies the author includes an organization identification subfield for the name of the author's organization; a contact person subfield for a description of the contact person for the organization; a person subfield for a description of at least one person who rated the content; and a type subfield for type of content that the at least one person is proficient in rating.

2. A method for linking subjective information about multimedia content to the content so that the content can be automatically selected or filtered by a user, the method comprising the acts of:
   providing a subjective information record having a field for inputting data which identifies a multimedia content and its location and a field which identifies an author of subjective information about the multimedia content;
   linking the subjective information generated by the author to the content using the subjective information record; and
   filtering the content based on the subjective information for outputting a filtered content, wherein the field that identifies an author of subjective information about the multimedia content further includes a subfield for type of content that the author is proficient in rating.

3. A multimedia content retrieval and filtering apparatus comprising:
   a multimedia filter;
   an electronic program guide for inputting feature data describing each multimedia program into the filter;
   a user profile for inputting user profile and viewing history data into the filter; and
   a subjective information record for inputting data into the filter that enables subjective information about a multimedia content to be represented with defined syntax and semantics and linked to the multimedia content,
   wherein the subjective information include at least one person who rated the content and type of content that the at least one person is proficient in rating, and
   wherein the multimedia filter is configured to filter multimedia contents based on the electronic program guide, the user profile and subjective information linked to the multimedia contents.

4. The non-transitory computer readable medium according to claim 1, wherein the record is useful in a multimedia retrieval device that automatically selects or filters multimedia content according to user preferences.

5. The non-transitory computer readable medium according to claim 1, further comprising a field for a language of the subjective information.

6. The non-transitory computer readable medium according to claim 5, wherein the field for a language of the subjective information includes a dictionary identification subfield for a name of a classification scheme listing all languages; a language identification subfield for an identifier of the language used to author the subjective information; and a location identification subfield for the location of the classification scheme.

7. The non-transitory computer readable medium according to claim 1, wherein the field for inputting data that identifies a multimedia content and a location of the multimedia content includes an identification subfield for the identification of the instantiation of the subjective information and a content identifier subfield for the identification and location of the content.

8. The non-transitory computer readable medium according to claim 1, wherein the field for inputting data that identifies an author of subjective information about the multimedia content further includes a subfield for a location of additional information about the author.

9. The non-transitory computer readable medium according to claim 1, wherein the field for subjective information about the content includes a dictionary identification subfield for a name of a rating scheme; a rating identification subfield for an identifier of the rating which uniquely identifies rating of content within a rating scheme; a location identification subfield for the location of the rating scheme; and a comments subfield for the subjective information in unconstrained free text.

10. The non-transitory computer readable medium according to claim 1, wherein the subjective information record is useable as an MPEG-7 description scheme.

11. The non-transitory computer readable medium according to claim 1, wherein the subjective information record is useable as a TV-Anytime metadata structure.

12. The method of claim 2, wherein the field which identifies the author includes an organization identification subfield for the name of the author's organization; a contact person subfield for a description of the contact person for the organization; and a person subfield for a description of at least one person who rated the content.

13. The apparatus according to claim 3, wherein the subjective information record includes:

a field for inputting data that identifies a multimedia content and a location of the multimedia content;

a field for inputting data that identifies an author of the subjective information about the multimedia content; and a field for subjective information about the multimedia content;

wherein the identifier in the field for inputting data that identifies a multimedia content and a location of the multimedia content enables the multimedia retrieval system to link the subjective information to the multimedia content.

14. The apparatus according to claim 3, wherein the subjective information record comprises an MPEG-7 description scheme.

15. The apparatus according to claim 3, wherein the subjective information record comprises a TV-Anytime metadata structure.

16. The apparatus of claim 3, wherein the subjective information record includes a field that identifies an author of the subjective information about the multimedia content, and wherein the field that identifies the author includes an organization identification subfield for the name of the author's organization; and a contact person subfield for a description of the contact person for the organization.

* * * * *